May 2, 1950 C. F. SCHWAN 2,505,795
COOLING POWER UNIT
Filed Nov. 13, 1946 3 Sheets-Sheet 1

INVENTOR.
Clarence F. Schwan

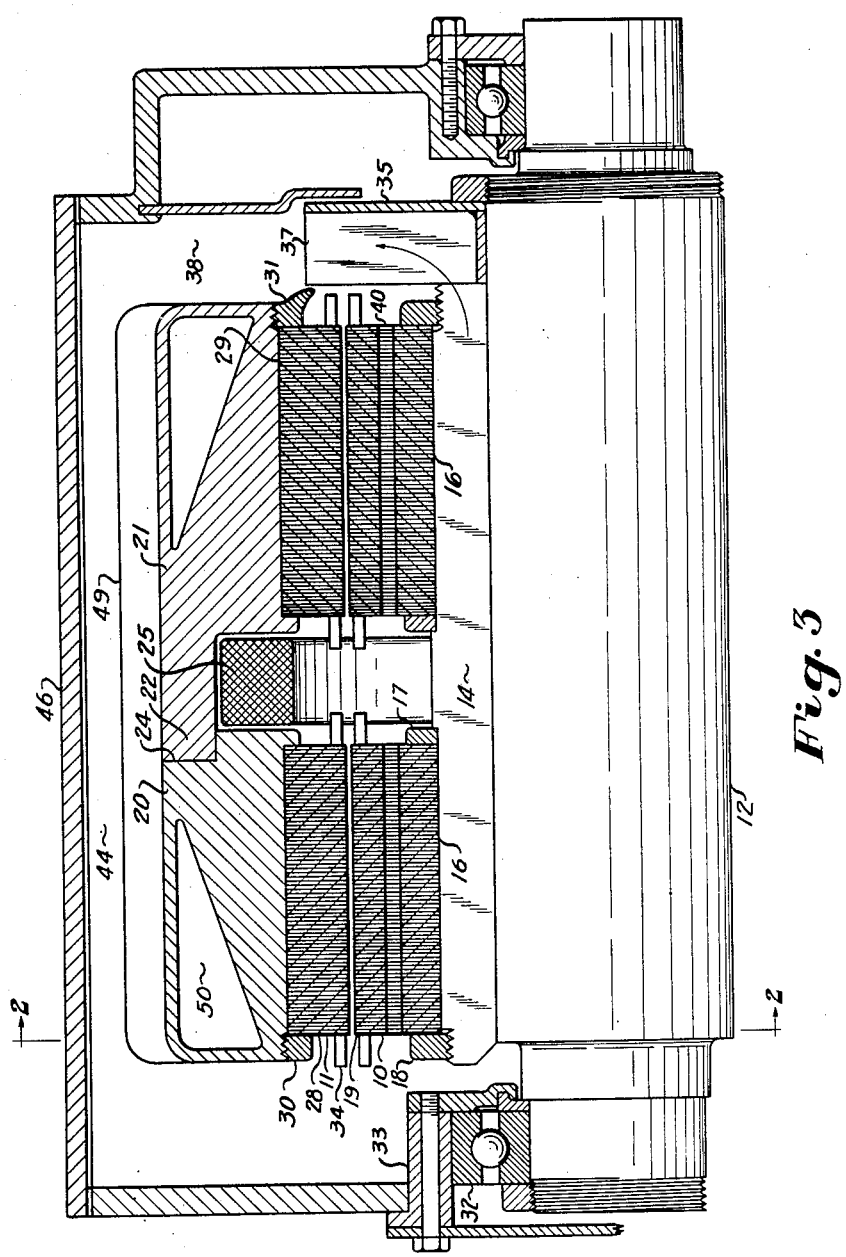

Patented May 2, 1950

2,505,795

UNITED STATES PATENT OFFICE 2,505,795

COOLING POWER UNIT

Clarence F. Schwan, Warrensville Heights, Ohio, assignor to The Ohio Crankshaft Company, Cleveland, Ohio, a corporation of Ohio Application November 13, 1946, Serial No. 709,643

3 Claims. (Cl. 171—252)

The present invention relates as indicated to means and method for cooling power units and is directed primarily to cooling rotary type electric generators and motors, but with modifications it is adapted for use in cooling other apparatus such as transformers and high frequency oscillator tubes. It is adaptable also to the cooling of power units such as some forms of internal combustion apparatus. Means for cooling generators and motors are well known. Fans for circulating air through such machines have been employed for many years. The circulation of water through parts of generators and motors for absorbing heat generated in various parts of such machines has also been known and employed. However, the combination of such air and water cooling possesses advantages which have not been generally recognized. In co-pending application Serial No. 548,084, filed August 4, 1944, now Patent No. 2,466,007, by F. S. Denneen and W. C. Dunn and owned by the assignee of the present application, one form of such combination of cooling means has been shown and described. In the apparatus of that application, external heat transfer means have been employed. The present invention is an improvement on the means and method shown and described in that application in that such external transfer means is not required.

Very frequently it is found necessary to operate motors, generators and other machines in atmospheres of harmful vapors or air filled with dust which not only accumulates in parts of such machines interfering with their normal cooling and operation, but particles of the dust are frequently abrasive and seriously damage parts, such as bearings, of these machines. Also the insulating effect of layers of dust which collect on surfaces of interior parts of such machines interferes with the normal flow and dissipation of heat from parts in which heat is generated. Such machines when operated at substantially full load heat rapidly and soon attain harmful temperatures. Usually, as the temperature rises unequal expansions occur resulting in reduced air gap clearances. The change in output and voltage caused by decreased air gaps cause serious power fluctuations and a very harmful reduction in the over-all performance of the machine.

In view of the above conditions it has been an object of the present invention to provide means for cooling internal parts of electric machines which it has not been able to cool efficiently heretofore. One of the objects of this invention has been to equalize temperatures so as to control air gap and other clearances and thus to reduce the size of such machines and the amount of material required in their construction. Another object has been to provide means for operating such machines at lower temperatures than it was possible to operate them heretofore. An additional object has been to provide fluid circulating means in which the amount of fluid required is greatly reduced. A further object has been to provide means for the rapid and direct transfer of heat from heated parts to the cooling fluid. Another object has been to provide a structure adaptable to change for controlling a rate of cooling of an inner part of such apparatus. A further object has been to provide a structure in which parts are readily proportioned to provide maximum cooling with minimum reluctance in magnetic circuits of the mechanism. A still further object has been to provide means for localizing and removing accumulations of foreign particles from the liquid in the machines. An additional object has been to provide a method of cooling power generating or transforming apparatus which is applicable generally to all such apparatus.

A more specific object of the invention is the provision of new and improved rotary electrical apparatus including a rotor and a stator about the rotor, the stator including laminations with a circumferentially-extending cooling-medium passage about the laminations and longitudinally-extending cooling-medium passages exteriorly of the circumferentially-extending passage.

Still a further object is new and improved rotor electrical apparatus of the type comprising a rotor and a stator, the stator comprising laminations about the rotor, a shell supporting the laminations and having a passage extending substantially the full circumferential length of the shell about the laminations and a housing surrounding the shell and in spaced relationship thereto to form longitudinally-extending cooling-medium passages over generally the entire length of the stator.

With these and other objects in view, this invention then consists of the general method of cooling power generating and transmitting equipment together with the apparatus used in the practice of this method.

To provide a better understanding of this invention, one form of it is hereinafter explained, reference being had to the accompanying drawings.

In the drawings:

Fig. 3 is a plan view partly in section taken at 3—3 of Fig. 2.

Figure 1:
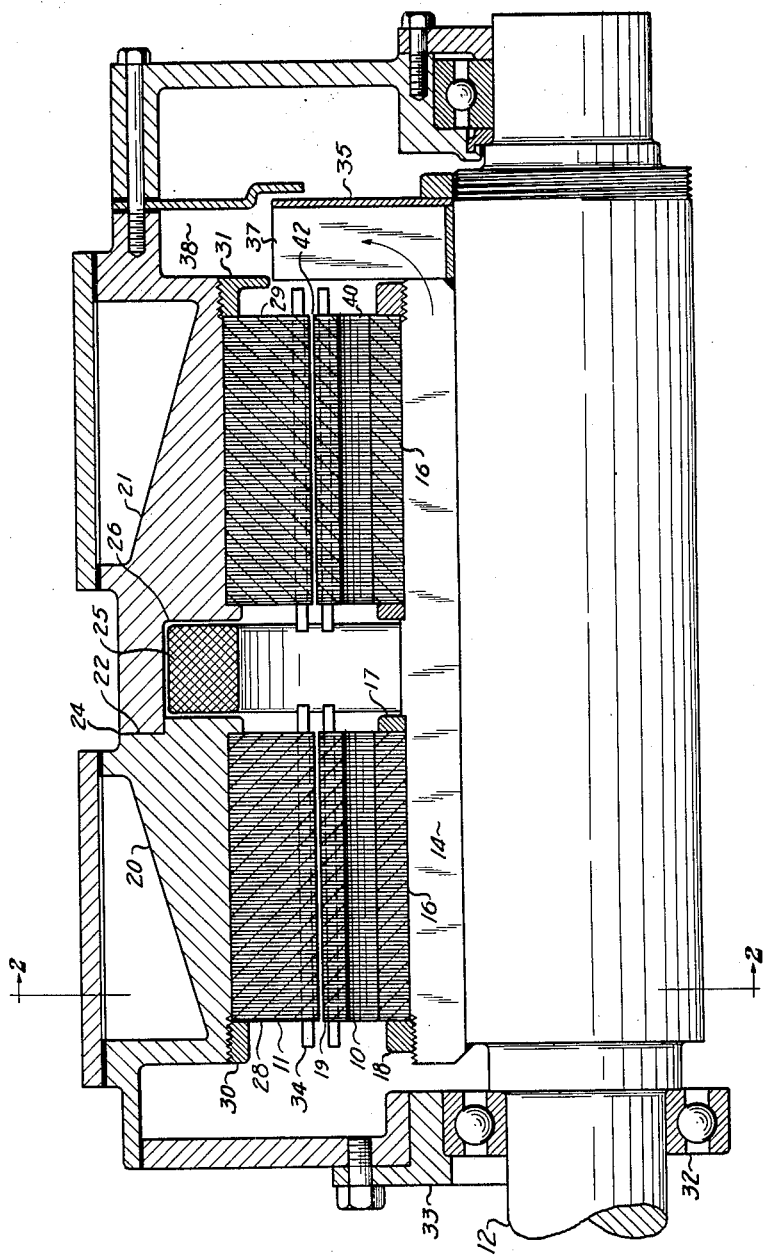
Fig. 1 is a longitudinal elevation partly in section taken at 1—1 of Fig. 2.
Figure 2:
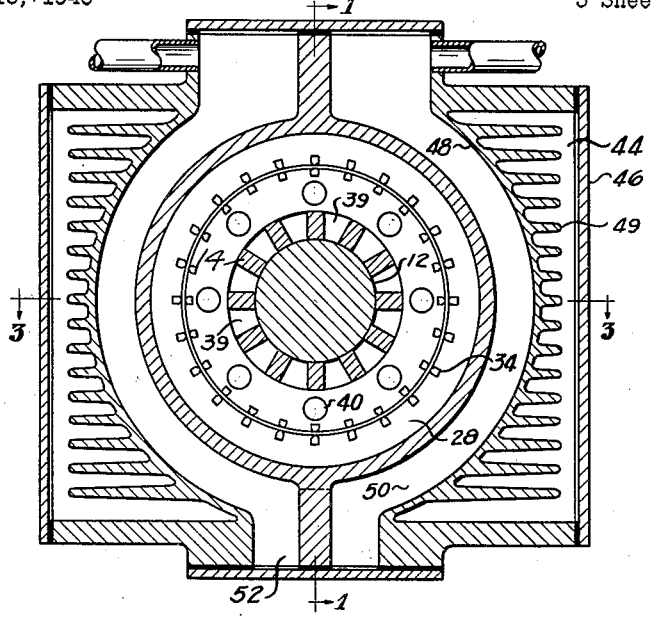
Fig. 2 is a transverse elevation partly in section taken at 2—2 of Fig. 1.

Referring now to Figs. 1, 2 and 3 a generator is shown which comprises the rotor indicated generally at 10 and stator 11. The rotor comprises shaft 12 to which bars 14 are attached, usually by welding, which bars are machined to accurately support laminated cores 16 in concentric relation with the shaft, the laminations being firmly compressed between shaft ring 17 and ring nut 18 which engages threads cut on the ends of bar 14. These laminations have teeth or slots 19 cut in their outer peripheries. The stator comprises frame members 20 and 21 held in concentric relation by pilot 22 and with annular surfaces abutting at 24 to close the exterior part of a magnetic circuit which is provided by annular field coil 25 lying in the annular space 26 between interior parts of members 20 and 21. Members 20 and 21 are bored to receive two groups of laminations 28 and 29 in close heat conducting engagement. The laminations are held firmly in place and clamped together by rings such as 30 and 31. After assembly stator laminations 28 and 29 are so bored and rotor laminations 16 are so turned that the rotor rotates in the stator with a very limited clearance, the rotor being accurately supported on anti-friction bearings such as 32 carried in bearing supports 33 of the stator frame members. Windings 34 in which high frequency current is generated are set in slots in the inner periphery of the stator laminations and are provided with leads extending through a side wall of the generator housing.

Considerable heat is generated by hysteresis and eddy currents in both rotor and stator, and means are provided to cool both of these parts. It will be obvious that liquids, which are usually more effective cooling agents than gases, cannot readily be brought into heat conducting contact with all parts, such as parts of the rotor, and that gases must be employed to pick up the heat from these rotor parts and transfer it to other parts of the machine where it is conducted into cooling liquid or is carried away by exterior radiation. It will be observed that the generator shown in Figs. 1, 2 and 3 above described, possesses the required elements for such removal of heat. Sufficient air, hydrogen or other gas at desired pressure is usually confined within the outer walls of the generator and is circulated in generally axial directions by blower or fan 35 whose rotating member is attached to shaft 12 either directly or is secured to the ends of bars 14 as shown. When the shaft is turning at normal speed, the vanes 37 of the fan by centrifugal force throw the air radially outward in the blower casing 38, the inlet to this casing being passages 39 between bars 14 and holes 40 which pass entirely through laminated cores 16. Some air also passes through the annular clearance space 42 between rotor and stator. This air, by thus passing axially through the interior, over the exterior, and through the passages in the laminated cores 16 of the rotor, comes into effective heat transferring relation with this core and heat generated in the core is rapidly absorbed by the air. This heated air is then cooled by flowing it through passages 44 which extend axially through opposite sides of the stator. In traversing these passages the air comes into contact with outer wall or cover 46 through which some heat flows from the heated air into the outside atmosphere. Most of the heat which has been picked up by the air in passing through and over the rotor core, however, is absorbed by wall 48, fins 49 generally integral therewith greatly increasing the heat absorbing area of this wall. The heat absorbed by this finned wall is rapidly transferred to water passing through annular jacket 50, the finned wall forming a partition between the outer air passage and the water jacket. By selecting longer, thinner and more numerous fins the heat absorbing surface may be increased to any desired degree and by controlling temperatures of the water or other fluid flowing through the jacket the temperature of the air being returned to the rotor is reduced to any desired degree.

The water in passing through jacket 50 not only absorbs heat from wall 48 through which it is conducted from the air in passage 44, but this water rapidly absorbs heat produced in the stator core 29. This core, being tightly fitted into the bore of the housing is in excellent heat conducting contact with the inner housing wall into which its heat is rapidly transferred and from which it is absorbed by the water in jacket 50. The water in this jacket may circulate in various directions such as axially, circumferentially or helically. Fig. 2 shows means for a circumferential flow of the water. A sediment trap 52 is shown at the bottom of the jacket where dirt collects which otherwise might obstruct the flow of the water or adhere to surfaces of the jacket wall and retard the transfer of heat to the jacket water.

Figure 4:
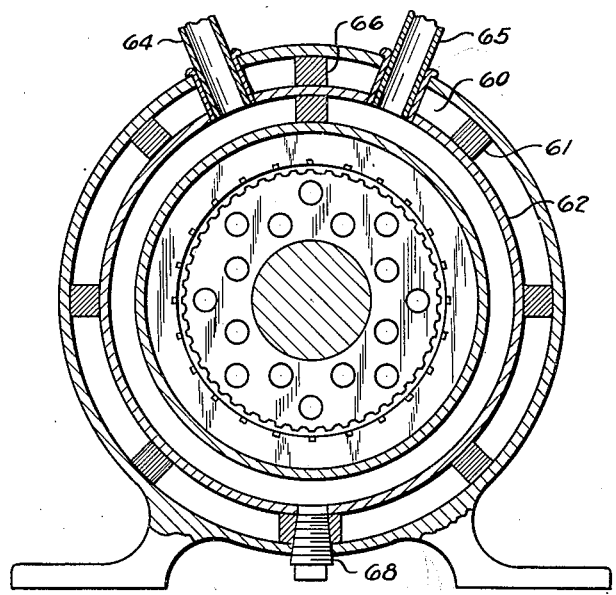
Fig. 4 is a transverse section similar to Fig. 2 showing a modification of the fluid circuits.

In Fig. 2 the cooling air passes through opposite sides of stator frame. A more uniform distribution of air is obtained in the arrangement shown in Fig. 4. The fan or blower draws air through the rotor in substantially the same way as is shown in Figs. 1, 2 and 3, but it is delivered so as to flow axially through outer passages such as 60 in the stator frame forming a substantially complete cylindrical stream substantially equally distributing its cooling effect throughout the periphery of the stator. Spacing members 61 serve as means for locating the core supporting ring 62 within the frame. Inlet and outlet passages 64 and 65 for cooling water are placed adjacent to each other at the top of the stator, being separated by a partition 66 to insure a substantially complete peripheral circuit for the water in the space between the outer air jacket and the inner core support ring 62. Means for drawing off accumulations of sediment is provided at the lower part of the water jacket as indicated at 68.

Numerous modifications can be made in the construction of the generator illustrated. For instance, bars 14 can be omitted and the laminations of core 16 can be attached directly to shaft 12 and additional passages similar to holes 40 provided for the flow of additional cooling fluid. Also shaft 12 can be made of tubular or other hollow construction to provide a passage for additional cooling medium or to serve as means for distributing the cooling medium to various parts of the apparatus.

In the construction shown fan 37 is so made and passages 39 and 40 are so selected as to size and location as to control the amount of air or other gas passing through rotor 10. The size of the rotor core supporting ribs 14 is so proportioned as to not only offer the necessary area for cooling air passages 39 lying between adjacent ribs, but these ribs are large enough to serve efficiently as a part of the magnetic circuit passing through the rotor core. The control provided by the fan and by the rotor passages, in combination with valve means for controlling the amount of water or other liquid passing through jacket 50 and the temperature of that liquid, readily so regulates the relative temperatures of rotor and stator that the temperature of one is maintained at a substantially definite preselected value relative to the other. By this means thermal expansion of rotor and stator are so controlled that air gap 42 is maintained constant or in some cases is reduced to a prescribed amount as the temperatures of rotor and stator rise to maximum values. As the air gap decreases to a prescribed minimum, the output and efficiency of the generator both tend to increase, the temperatures being controlled, however, by the circulations of the cooling fluids so that sufficient operating clearance between rotor and stator is always maintained.

It will be apparent to those skilled in the art that many changes in the method of cooling heat generating apparatus and various modifications in the mechanism required for such cooling may be made without departing from the spirit of this invention. The appended claims are for the purpose of defining the limits of the invention.

What I claim is:

1. In rotary electrical apparatus, a rotor, a stator comprising laminations about said rotor and a shell supporting said laminations, a passage in said shell extending substantially the full circumferential length of said shell, means for circulating a cooling medium circumferentially through said passage, said stator also including a housing substantially surrounding said shell and in spaced relationship thereto and means for circulating a cooling medium longitudinally of said stator through the space between said housing and said shell.

2. In rotary electrical apparatus, a rotor, a stator comprising laminations about said rotor and a shell supporting said laminations, a passage in said shell extending substantially the full circumferential length of said shell, means for circulating a cooling medium circumferentially through said passage, said stator also including a housing surrounding said shell and in spaced relationship thereto, said shell having a plurality of longitudinally-extending fins extending into said space and means for circulating air longitudinally through said space and over said fins.

3. In rotary electrical apparatus, a rotor, a stator comprising laminations about said rotor and a shell supporting said laminations, a passage in said shell extending substantially the full circumferential length of said shell, means for circulating a cooling medium circumferentially through said passage, said stator also including a housing surrounding said shell and in spaced relationship thereto and means for circulating a cooling medium longitudinally of said stator through the space between said housing and said shell, said passage having a sediment trap extending substantially throughout its axial length positioned at the lower most point thereof.

CLARENCE F. SCHWAN.

REFERENCES CITED

The following references are of record in the file of this patent:

UNITED STATES PATENTS

| Number | Name | Date |
|---|---|---|
| 716,278 | Reist | Dec. 16, 1902 |
| 1,733,179 | Baumann | Oct. 29, 1929 |
| 2,220,032 | Winther | Oct. 29, 1940 |
| 2,306,582 | Winther | Dec. 29, 1942 |
| 2,414,532 | Johns | Jan. 21, 1947 |

FOREIGN PATENTS

| Number | Country | Date |
|---|---|---|
| 37,816 | Austria | July 10, 1909 |
| 684,240 | France | Mar. 17, 1930 |